United States Patent
Suzuki et al.

(10) Patent No.: US 9,340,159 B2
(45) Date of Patent: May 17, 2016

(54) VEHICLE MIRROR APPARATUS

(71) Applicant: MURAKAMI CORPORATION, Shizuoka (JP)

(72) Inventors: Kentaro Suzuki, Kamagaya (JP); Masahiro Motomiya, Fujieda (JP)

(73) Assignee: MURAKAMI CORPORATION, Shizuoka (JP)

( * ) Notice: Subject to any disclaimer, the term of this patent is extended or adjusted under 35 U.S.C. 154(b) by 196 days.

(21) Appl. No.: 14/183,928

(22) Filed: Feb. 19, 2014

(65) Prior Publication Data

US 2014/0233125 A1 Aug. 21, 2014

(30) Foreign Application Priority Data

Feb. 20, 2013 (JP) ................. 2013-030731

(51) Int. Cl.
  *G02B 7/182* (2006.01)
  *B60R 1/072* (2006.01)

(52) U.S. Cl.
  CPC ...................... *B60R 1/072* (2013.01)

(58) Field of Classification Search
  CPC .............. G02B 5/08; B60R 1/06; B60R 1/04; B60R 1/072; B60R 1/062; B60R 1/076; B60R 1/00; B60R 1/02; B60R 1/0615; B60R 1/0625; B60R 1/066; B60R 2011/0026; B60R 2011/0033; B60R 1/07; B60R 1/064
  USPC .................................................. 359/872–877
  See application file for complete search history.

(56) References Cited

U.S. PATENT DOCUMENTS

2005/0225886 A1* 10/2005 Yamada ................. B60R 1/072
                                                    359/877

FOREIGN PATENT DOCUMENTS

JP        10-067281 A     3/1998
JP        4217187 B      11/2008

OTHER PUBLICATIONS

U.S. Appl. No. 14/183,899 to Ryosuke IBA, filed Feb. 19, 2014.

* cited by examiner

*Primary Examiner* — Darryl J Collins
*Assistant Examiner* — Mustak Choudhury
(74) *Attorney, Agent, or Firm* — Greenblum & Bernstein, P.L.C.

(57) ABSTRACT

Moving a mover for mirror surface angle detection following a nut member along a male thread member in such a manner that the mover is rotatable relative to the nut member and is non-rotatable relative to the male thread member, without biasing the mover by means of a spring. A communication hole is provided in a male thread member along a shaft axis of the male thread member. A mover is inserted through the communication hole so as to be movable in an axial direction. A front end of the mover is connected to a position in a back of a front end of a nut member so as to be rotatable relative to the nut member around the axis of the nut member. A position detection device detects a position of the mover relative to a base member in a direction along the male thread member.

5 Claims, 9 Drawing Sheets

VEHICLE MIRROR APPARATUS

The disclosure of Japanese Patent Application No. JP2013-030731 filed on Feb. 20, 2013 including the specification, drawings, claims and abstract is incorporated herein by reference in its entirety.

BACKGROUND OF THE INVENTION

1. Field of the Invention

The present invention relates to a vehicle mirror apparatus, and specifically relates to a vehicle mirror apparatus having a mirror surface angle detection device of the type in which a mirror surface angle is detected using a male thread member and a nut member of a tilting device (mirror surface angle adjustment actuator). The present invention eliminates the need to, in such type of mirror surface angle detection device, bias a mover for mirror surface angle detection by means of a spring in order to move the mover following the nut member along the male thread member in such a manner that the mover is rotatable relative to the nut member and is non-rotatable relative to the male thread member.

2. Description of the Related Art

In vehicle mirror apparatuses including a tilting device, a mirror surface angle detection device is installed in, e.g., what is called a memory mirror or what is called a reverse interlock mirror. A memory mirror is a mirror that automatically adjusts a mirror surface angle to a prestored angle. A reverse interlock mirror is a mirror that in association with gear shift operation means of the vehicle being thrown into a reverse position, automatically rotates a mirror surface of a vehicle outside mirror downward by a predetermined amount of angle to enable a driver to view an area around the rear wheel. Japanese Patent Laid-Open No. 10-67281 and Japanese Patent No. 4217187 each describe a conventional mirror surface angle detection device for a vehicle mirror apparatus. The vehicle mirror apparatus described in Japanese Patent Laid-Open No. 10-67281 includes an independent mirror surface angle detection device provided separately from a male thread member and a nut member included in a tilting device. The vehicle mirror apparatus described in Japanese Patent No. 4217187 includes a mirror surface angle detection device using a male thread member and a nut member.

FIG. 12 illustrates a tilting device equipped with the mirror surface angle detection device described in Japanese Patent No. 4217187. In FIG. 12, parts corresponding to respective parts of the later-described embodiment of the present invention are provided with reference numerals that are the same as those of the embodiment. The tilting device is configured as follows. An actuator housing 12 (base member) is fixed to a mirror housing (not illustrated). In the actuator housing 12, a plate pivot 46 (tilting member) is supported so as to be tiltable around a predetermined tilting center (not illustrated). On the plate pivot 46, a mirror (not illustrated) is mounted. At a part of the actuator housing 12 that is off the tilting center, a male thread member 16 with a male thread formed at an outer peripheral surface thereof is provided in a standing manner. A rear end of an adjustment nut 28 (nut member) is rotatably screwed on a free end of the male thread member 16 and covers the free end, and a projecting spherical portion 28a of a front end of the adjustment nut 28 is connected to a recessed spherical portion 53 formed at a part of the plate pivot 46 that is off the tilting center, by ball joint connection. Upon the motor 20 being driven, rotation of the motor 20 is transmitted to the adjustment nut 28 via a worm gear 36 and a wheel worm 24. Consequently, the adjustment nut 28 ascends and descends along the male thread member 16 while rotating, and tilts the plate pivot 46 to adjust a mirror surface angle.

The mirror surface angle detection device is configured as follows. A communication hole 17 is provided in the male thread member 16 along a shaft axis of the male thread member 16. A slide block 90 (mover) is inserted through the communication hole 17 in such a manner that the slide block 90 is movable in an axial direction. The slide block 90 is biased by a coil spring 11 disposed between the actuator housing 12 and the slide block 90 to press the slide block 90 against a surface in a back of the projecting spherical portion 28a of the adjustment nut 28 and thereby make the slide block 90 abut against the surface, whereby the slide block 90 is locked. A hollow of the slide block 90 houses a slide contact 91 (contact member) in such a manner that the slide contact 91 is non-movable relative to the slide block 90 in neither an axial direction nor a shaft rotation direction. The slide contact 91 pinches a print wiring board 94 fixed to the actuator housing 12 so as to stand on the actuator housing 12 and thereby the slide contact 91 is in contact with a resistor printed on a surface of the print wiring board 94. Rotation of the slide block 90 is blocked by the force of pinching the print wiring board 94 by the slide contact 91. Upon the adjustment nut 28 being rotated as a result of the motor 20 being driven and the adjustment nut 28 moving along the male thread member 16, the slide block 90 moves following the adjustment nut 28 in an axial direction of the male thread member 16 without rotation, by means of a pressing force of the coil spring 11. Consequently, a position in the print wiring board 94 that is in contact with the slide contact 91 changes, and the contact position change is detected as a voltage change resulting from a resistance value change, whereby a mirror surface angle is detected.

The mirror surface angle detection device described in Japanese Patent Laid-Open No. 10-67281 requires provision of an independent mirror surface angle detection device separately from a male thread member and a nut member in a tilting device. The mirror surface angle detection device described in Japanese Patent No. 4217187 enables provision of a mirror surface angle detection device using a male thread member and a nut member in a tilting device, but requires the slide block 90 to be biased by the coil spring 11 in order to move the slide block 90 following the adjustment nut 28 along the male thread member 16 in such a manner that the slide block 90 is rotatable relative to the adjustment nut 28 and is non-rotatable relative to the male thread member 16.

The present invention is intended to solve the aforementioned problems of the conventional techniques in a vehicle mirror apparatus having a mirror surface angle detection device of the type in which a mirror surface angle is detected using a male thread member and a nut member in a tilting device. In other words, the present invention is intended to provide a vehicle mirror apparatus having a mirror surface angle detection device that eliminates the need to bias a mover using a spring in order to move the mover following a nut member along a male thread member in such a manner that the mover is rotatable relative to the nut member and is non-rotatable relative to the male thread member.

SUMMARY OF THE INVENTION

In one aspect of the present invention, a vehicle mirror apparatus according to the present invention comprising a tilting device tilting a mirror to adjust a tilting angle of the mirror and a mirror surface angle detection device detecting the tilting angle of the mirror: the tilting device including a base member, a tilting member supporting the mirror on the base member in such a manner that the mirror being tiltable around a predetermined tilting center, a male thread member provided so as to stand on the base member, a nut member having a rear end being rotatably screwed on and covering a free end of the male thread member and a front end rotatably connected to a position in the tilting member, the position being off the tilting center of the tilting member, and a drive device reversibly rotating the nut member to move the nut member along the male thread member to tilt the tilting member; the mirror surface angle detection device including a communication hole provided in the male thread member along a shaft axis of the male thread member, a mover inserted through the communication hole so as to be movable in an axial direction thereof, the mover having a front end connected to the nut member at a position in a back of the front end of the nut member so as to be rotatable relative to the nut member around an axis of the nut member, the mover moving following the nut member along the male thread member in such a manner that rotation of the mover relative to the male thread member being prevented, and a position detection device detecting a position of the mover in a direction along the male thread member relative to the base member. According to the aspect of the present invention, the mover is connected to the nut member at the position in the back of the front end of the nut member so as to be rotatable relative to the nut member around the axis of the nut member, enabling the mover to move following the nut member along the male thread member without rotation of the mover relative to the male thread member. Accordingly, it is possible to make the mover follow the nut member without biasing by means of a spring and rotation of the mover relative to the male thread member.

In another aspect of the present invention, it is possible that the mover and the nut member are interconnected via a ball joint formed between the front end of the mover and the position in the back of the front end of the nut member. Accordingly, the mover and the nut member are interconnected via the ball joint, enabling the mover to move following the nut member along the male thread member without rotation of the mover relative to the male thread member. In this case, the ball joint can have a recessed shape on the nut member side and a projecting shape on the mover side or have a projecting shape on the nut member side and a recessed shape on the mover side. If the ball joint has a recessed shape on the nut member side and a projecting shape on the mover side, the front end of the mover can be configured to be small compared to the opposite case, providing a structure suitable for inserting the mover into the communication hole of the male thread member from the front end side of the mover.

In another aspect of the present invention, it is possible that the mover is connected to the position in the back of the front end of the nut member by inserting the mover into the communication hole of the male thread member from the side of the base member opposite to a surface on which the male thread member stands. Accordingly, the mover can be connected to the position in the back of the front end of the nut member by inserting the mover into the communication hole of the male thread member from the side of the base member opposite to the surface on which the male thread member stands.

In another aspect of the present invention, it is possible that the mover penetrates the base member and projects on the back side of the base member opposite to the surface on which the male thread member stands and the position detection device is arranged on the back side of the base member. Accordingly, the position detection device can be arranged on the back side of the base member.

In another aspect of the present invention, it is possible that: the mover includes a shaft portion inserted through the communication hole of the male thread member, a connection portion arranged outside the front end of the communication hole, the connection portion being connected to the nut member, and a bulge portion arranged outside a rear end of the communication hole, the bulge portion having a non-circular shape in a cross-section perpendicular to a direction of movement of the mover; and the bulge portion is arranged in an empty space formed on the base member side, the empty space housing the bulge portion in such a manner that the bulge portion is movable in the axial direction of the mover and is non-rotatable around an axis of the mover. Accordingly, engagement between the bulge portion and a part around the empty space enables the mover to move following nut member along the male thread member without rotation of the mover relative to the male thread member.

In another aspect of the present invention, it is possible that the empty space is formed inside a sensor case fixed to a surface of the base member, the surface being opposite to the surface on which the male thread member stands, and the shaft portion of the mover extends out from the sensor case and is inserted through the communication hole of the male thread member. Accordingly, the position detection device can be assembled to the tilting device by fixing the sensor case to the back side of the base member.

In another aspect of the present invention, it is possible that: the position detection device includes a resistor disposed on the base member side along the direction of movement of the mover, and a contact member disposed at the bulge portion of the mover, the contact member being in contact with the resistor; and the contact member slides along the resistor in association with movement of the mover. Accordingly, the bulge portion has both a function that blocks rotation of the mover and a function that allows disposition of the contact member. A position of the mover can be detected by detecting a position of contact between the contact member and the resistor by means of a change in quantity of electric value.

BRIEF DESCRIPTION OF THE DRAWINGS

FIG. 5A is a side view and FIG. 5B is a bottom view;

FIG. 10A is a front view and FIG. 10B is a cross-sectional view along arrow B-B;

DETAILED DESCRIPTION OF THE PREFERRED EMBODIMENT

Figure 4:
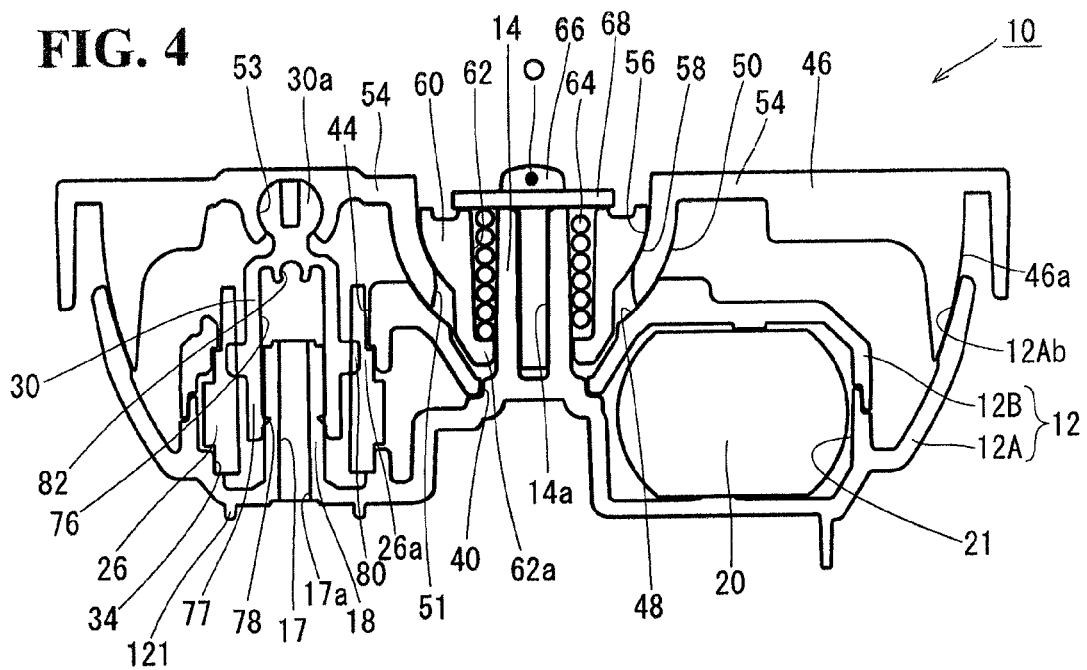
FIG. 4 is a diagram illustrating a state in which the tilting device 10 in FIG. 2 is assembled, which is a cross-sectional view along arrow A-A in FIG. 3.
Figure 5A:
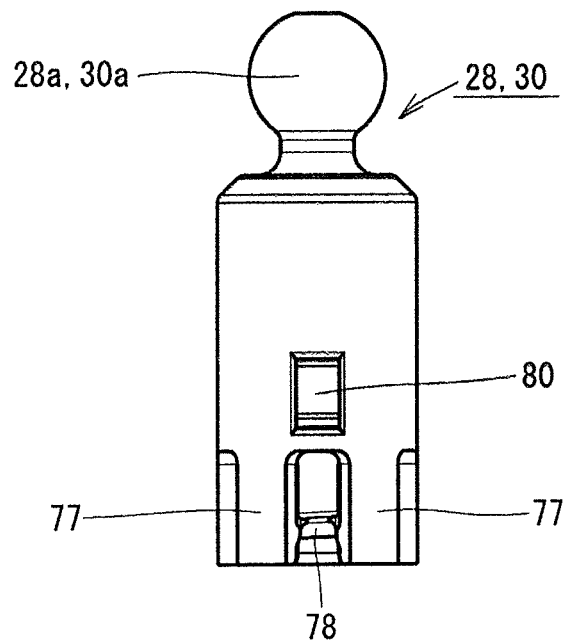
FIGS. 5A and 5B are enlarged views of an adjustment nut 28 or 30 in FIGS. 1 to 4.
Figure 5B:
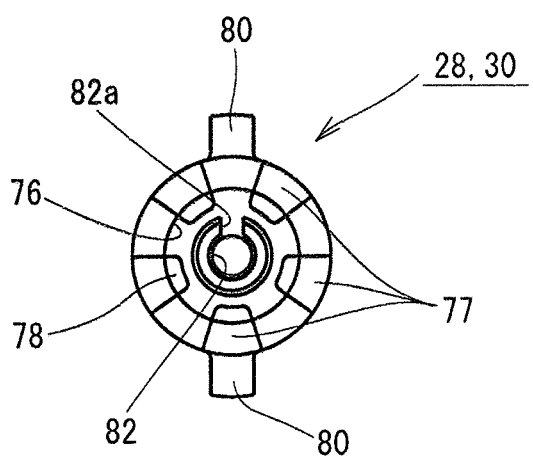

An embodiment of the present invention will be described. First, a tilting device 10 will be described with reference to FIGS. 1 to 5A and 5B. In the tilting device 10 in FIG. 2, each of a coil spring 64, a screw 66 and a retainer plate 68 can be formed using a metal, and components other than motors 20 and 22, the coil spring 64, the screw 66 and the retainer plate 68 can be formed using a plastic. As described later, an actuator housing 12 (base member) including a housing front 12A and a housing rear 12B in the tilting device 10 is fixed to a mirror housing (not illustrated). The housing front 12A has a bowl-like shape having a circular shape in the front. Inside the bowl of the housing front 12A, a boss 14 having a round rod shape is provided integrally with the housing front 12A so as to stand on a center axis of the bowl and two male thread members 16 and 18 are provided integrally with the housing front 12A so as to stand at off-center positions inside the bowl, respectively. The male thread member 18 is arranged at a position where the position of the male thread member 16 is rotated around the boss 14 by 90 degrees. A male thread is formed at an outer peripheral surface of each of the male thread members 16 and 18. On shaft axes of the male thread members 16 and 18, communication holes 17 and 17 (FIGS. 1 and 4) each having a circular shape in a cross-section perpendicular to the axis are formed. At a top of the boss 14, a screw hole 14a is formed.

Inside the bowl of the housing front 12A, two direct-current motors 20 (for horizontal tilting) and 22 (for vertical tilting), wheel worms 24 and 26 and adjustment nuts 28 and 30 (nut members) are housed. The motors 20 and 22 are housed and held in respective recesses 21 and 23. The adjustment nuts 28 and 30 coaxially and rotatably cover the respective free ends (upper ends) of the male thread members 16 and 18, and are threadably connected to the respective male threads at the outer peripheral surfaces of the male thread members 16 and 18, thereby the adjustment nuts 28 and 30 advance/retract along the respective male thread members 16 and 18 according to respective directions of rotation of the adjustment nuts 28 and 30. Respective lower portions of the wheel worms 24 and 26 are rotatably held in respective recesses 32 and 34 formed coaxially with the respective male thread members 16 and 18 inside the bowl of the housing front 12A. The wheel worms 24 and 26 engage with respective worm gear 36 and 38 attached to rotation shafts of the motors 20 and 22 and are thereby driven and rotated by the respective motors 20 and 22. The adjustment nuts 28 and 30 are connected to the respective wheel worms 24 and 26 in such a manner that the adjustment nuts 28 and 30 are non-rotatable relative to the respective wheel worms 24 and 26 and are movable relative to the respective wheel worms 24 and 26 in respective axial directions. Accordingly, upon the motor 20 or 22 being rotated, the corresponding adjustment nut 28 or 30 is rotated via the corresponding worm gear 36 or 38 and the corresponding wheel worm 24 or 26, whereby the adjustment nut 28 or 30 advances/retracts along the corresponding male thread member 16 or 18 according to a direction of the rotation.

The housing rear 12B is covered on and attached to a front surface of the housing front 12A. Consequently, the motors 20 and 22, the worm gears 36 and 38, the wheel worms 24 and 26 and the adjustment nuts 28 and 30 are housed in an internal space of the actuator housing 12 including the housing front 12A and the housing rear 12B. In this state, the boss 14 projects from an opening 40 at a center position of the housing rear 12B upward of the actuator housing 12. Upper portions of the wheel worms 24 and 26 and upper portions of the adjustment nuts 28 and 30 project from respective openings 42 and 44 formed at respective off-center positions of the housing rear 12B to the outside of the actuator housing 12.

On a front surface of the actuator housing 12, a plate pivot 46 (tilting member) is tiltably held. In other words, at a center portion of a front surface of the housing rear 12B, a recessed spherical portion 48 is formed, and at a central portion of a back surface of the plate pivot 46, a projecting spherical portion 50 (FIG. 4) is formed. Ball joint connection resulting from fitting the recessed spherical portion 48 and the projecting spherical portion 50 together holds the plate pivot 46 so that the plate pivot 46 is horizontally and vertically tiltable relative to the housing rear 12B. At a center position in the projecting spherical portion 50, an opening 51 is formed, and the boss 14 projects upward from the opening 51. At four sites in a circumferential direction of a wall surface included in the recessed spherical portion 48, cuts 52 are formed at equal intervals. In the plate pivot 46, connection portions 54 that connect a center portion (which is a part in which the projecting spherical portion 50 is formed) and respective peripheral edge portions at equal intervals at four sites in a circumferential direction are formed. The respective connection portions 54 are fitted in the respective cuts 52 so as be slidable in respective depth directions of the cuts 52. Consequently, the plate pivot 46 tilts in such a manner that rotation of the plate pivot 46 relative to the actuator housing 12 is blocked. At a lower surface of the plate pivot 46, recessed spherical portions 53 and 53 (FIG. 4) are formed at respective positions that face respective projecting spherical portions 28a and 30a at front ends of the adjustment nuts 28 and 30, and the projecting spherical portions 28a and 30a are fitted in the respective recessed spherical portions 53 and 53 and thus are connected to the recessed spherical portions 53 and 53 by means of ball joint connection.

At a back surface of the projecting spherical portion 50 of the plate pivot 46 (top surface of the plate pivot 46), a recessed spherical portion 56 is formed. In the recessed spherical portion 56, a cap support 60 having a projecting spherical portion 58 is housed. In the cap support 60, a circular hole 62 (FIG. 4) having a cylindrical shape is formed along a center axis thereof, and the boss 14 projects upward from the circular hole 62. A coil spring 64 is housed from above in a gap between an outer peripheral surface of the boss 14 and an inner peripheral surface of the circular hole 62. A lower end of the coil spring 64 is received and supported by an upper surface of a small-diameter portion 62a (FIG. 4) at a lower end of the circular hole 62 of the cap support 60.

The tilting device 10 is assembled, for example, as follows. The motors 20 and 22 with the worm gears 36 and 38 attached thereto are put in the respective recesses 21 and 23 of the housing front 12A. The adjustment nuts 28 and 30 are screwed onto the respective male thread members 16 and 18. The wheel worms 24 and 26 are coaxially put on the respective adjustment nuts 28 and 30, and lower portions of the wheel worms 24 and 26 are rotatably held in the respective recesses 32 and 34. Here, the wheel worms 24 and 26 engage with the respective worm gears 36 and 38. The housing rear 12B is covered on the housing front 12A. The plate pivot 46 is mounted on the housing rear 12B. The cap support 60 is put in the recessed spherical portion 56 of the plate pivot 46. The coil spring 64 is put in the gap between the outer peripheral surface of the boss 14 and the inner peripheral surface of the circular hole 62. In this state, the screw 66 is screwed from above and fixed in the screw hole 14a at the top of the boss 14, whereby the tilting device 10 is assembled as a single-piece article. The retainer plate 68 is held on the screw 66 and the screw 66 is screwed into the boss 14, whereby the retainer plate 68 compresses the coil spring 64. By an elastic force of the coil spring 64 due to the compression, the cap support 60 presses the plate pivot 46 downward, generating adequate frictional forces between the recessed spherical portion 48 and the projecting spherical portion 50 and between the recessed spherical portion 56 and the projecting spherical portion 58. The frictional forces allow the plate pivot 46 to be held at arbitrary tilting angles in horizontal and vertical directions relative to the actuator housing 12.

A tilting center O (FIG. 4) of the plate pivot 46 is formed at a spherical center of the recessed spherical portions 48 and 56 and the projecting spherical portions 50 and 58. An outer peripheral surface 46a of a lower portion of the plate pivot 46 is formed in a projecting spherical shape with the tilting center O as a center. An inner peripheral surface 12Ab of a peripheral edge portion of the housing front 12A is formed in a recessed spherical shape with the tilting center O as a center. When tilting the plate pivot 46, the outer peripheral surface 46a of the lower part of the plate pivot 46 and the inner peripheral surface 12Ab of the peripheral edge portion of the housing front 12A slide relative to each other. The tilting device 10 is fixed inside the mirror housing (not illustrated) via three screws (not illustrated). In other words, the three screws are inserted into three properly designated positions from among openings 45 (FIG. 2) at four positions at a front surface of the plate pivot 46 from the front surface side of the tilting device 10, and screwed into bosses (bosses directly formed at the mirror housing or bosses formed at frames to which the mirror housing is fixed) inside the mirror housing of the outer mirror (e.g., a door mirror or a fender mirror) through screw passage holes 47 (FIG. 2) of the housing rear 12B and screw passage holes 49 (FIG. 3) of the housing front 12A. Consequently, the housing rear 12B is connected to the bosses by means of screw fastening with the housing front 12A therebetween. In such a manner described above, the tilting device 10 is fixed inside the mirror housing. In other words, heads of the three screws are locked by the housing rear 12B, and the housing rear 12B and the housing front 12A are integrated by fastening of the three screws and fixed to the bosses inside the mirror housing. In the tilting device 10, a mirror subassembly 74 including a mirror 72 held by a mirror holder 70 is attached to the front surface of the plate pivot 46.

FIG. 5 illustrates the adjustment nut 28 or 30 in an enlarged manner. At the front end of the adjustment nut 28 or 30, the projecting spherical portion 28a or 30a to be connected to the recessed spherical portion 53 or 53 (FIG. 4) of the plate pivot 46 by means of ball joint connection is formed. Inside the adjustment nut 28 or 30, an empty space 76 or 76 for housing the male thread member 16 or 18 is formed. The empty space 76 or 76 opens at the rear end of the adjustment nut 28 or 30. The rear end of the adjustment nut 28 or 30 is divided into five legs 77 arranged at equal intervals in a circumferential direction. On the inner peripheral side of each leg 77, a lug 78 that is threadably connected to the male thread of the male thread member 16 or 18 is formed. On a side surface of the adjustment nut 28 or 30, projections 80 are formed. The projections 80 engage with grooves and cuts 24a or 26a (FIG. 2) formed in the wheel worm 24 or 26 in an axial direction thereof and connect the adjustment nut 28 or 30 to the wheel worm 24 or 26 in such a manner that the adjustment nut 28 or 30 is non-rotatable relative to the wheel worm 24 or 26 around the axis and is movable relative to the wheel worm 24 or 26 in the axial direction. At a far end surface at the bottom of the empty space 76 (position in the back of the projecting spherical portion 28a or 30a), a recessed spherical portion 82 or 82 is formed. A projecting spherical portion 90b or 92b at an extremity of the later-described slide block 90 or 92 (FIG. 7) is fitted in the recessed spherical portion 82 or 82, forming ball joint connection. In order to facilitate fitting of the projecting spherical portion 90b or 92b into the recessed spherical portion 82 or 82, a crack (cut) 82a is formed in a part of a peripheral wall surface of the recessed spherical portion 82 or 82.

Figure 1:
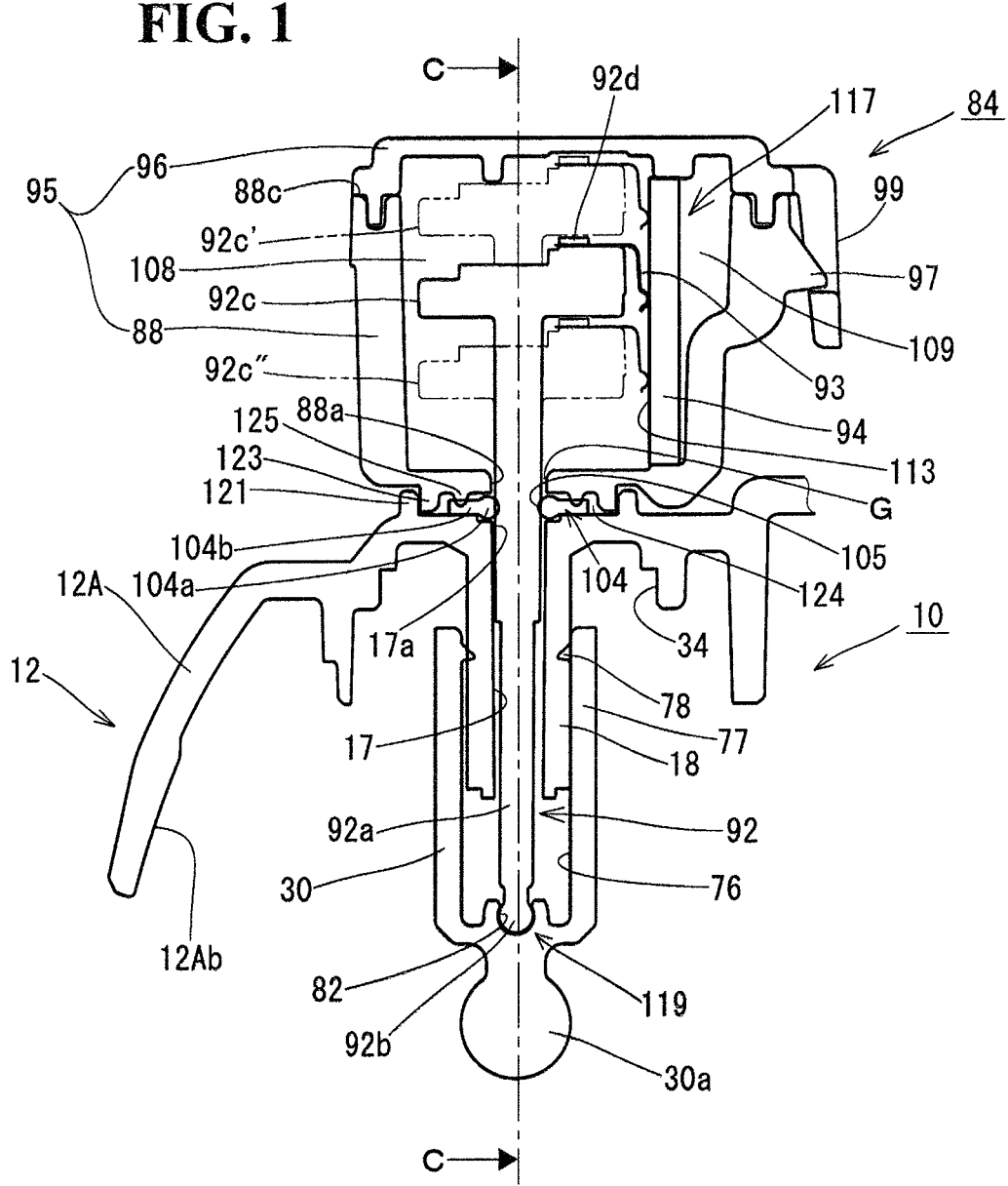
FIG. 1 is a partial cross-sectional diagram illustrating a state in which the mirror surface angle detection device 84 in FIG. 6 is attached to a tilting device 10 in the vehicle mirror apparatus in FIG. 2 (in FIG. 1, illustration of, e.g., drive devices for the tilting device 10 omitted), which is a cross-sectional view taken along a plane that extends through center axes of an adjustment nut 30 and a slide block 92 and is perpendicular to a print wiring board 94.
Figure 2:
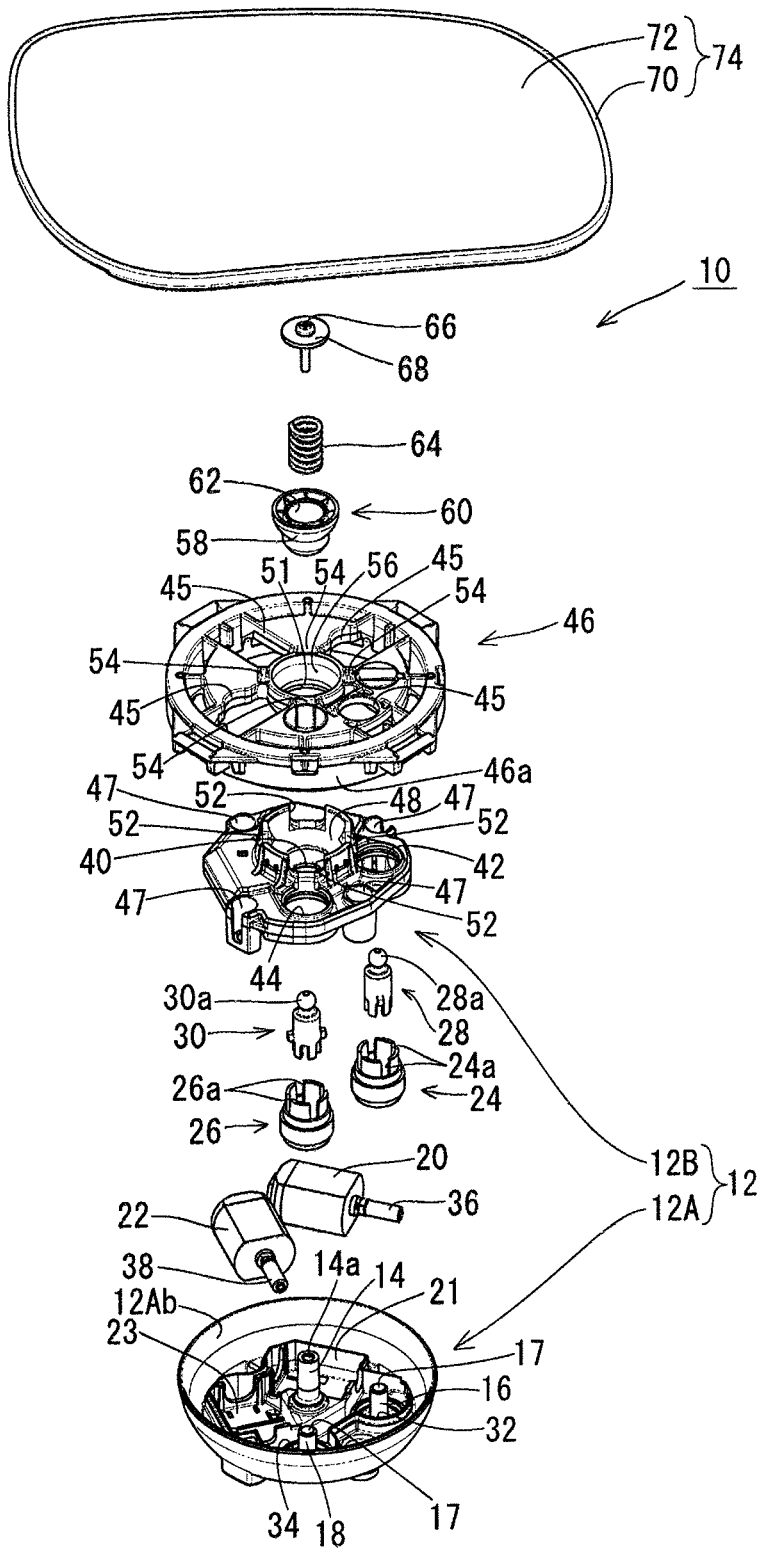
FIG. 2 is an exploded perspective view of the tilting device 10 for a vehicle mirror apparatus, which is an embodiment of the present invention.
Figure 3:
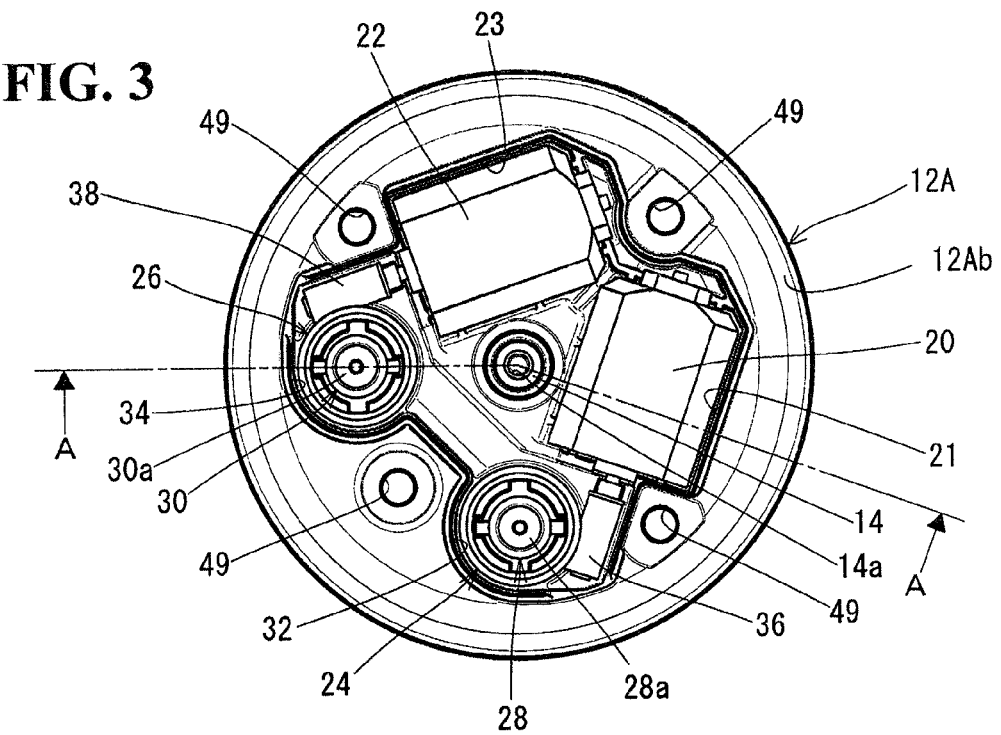
FIG. 3 is a front view illustrating a state in which drive devices are housed in a housing front 12A of the tilting device 10 in FIG. 2.
Figure 6:
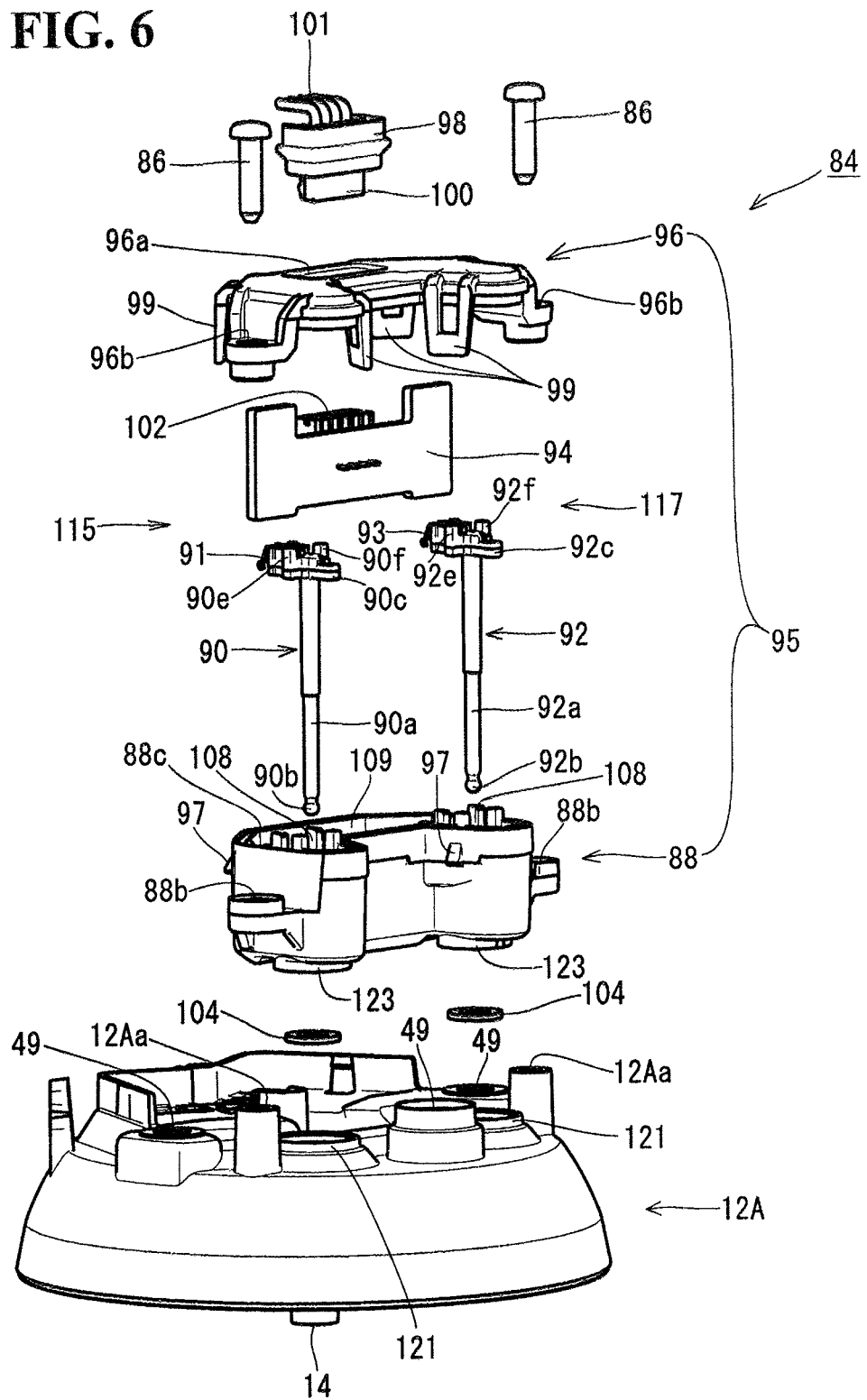
FIG. 6 is an exploded perspective view of a mirror surface angle detection device 84 attached to the tilting device 10 in FIG. 2.

Next, the mirror surface angle detection device 84 will be described with reference to FIGS. 1 and 6 to 11. Here, FIGS. 1 and 11 illustrate the slide block 92 side only, but a configuration that is the same as that of the slide block 92 side is provided on the slide block 90 side. In the mirror surface angle detection device 84 in FIG. 6, each of screws 86 and 86 and slide contacts 91 and 93 can be formed by a metal, and components other than the screws 86 and 86, the slide contacts 91 and 93, a rubber seal 98 and a print wiring board 94 and rubber O rings 104 and 104 can be formed by a plastic. In FIG. 6, in empty spaces 108 and 108 horizontally arranged inside the case body 88, rod-like slide blocks 90 and 92 (movers) with the respective slide contacts 91 and 93 attached thereto are housed so as to be movable in respective axial directions. In an empty space 109 connecting the empty spaces 108 and 108, the print wiring board 94 is immovably housed so as to face the slide contacts 91 and 93. The mirror surface angle detection device 84 is configured by putting the slide blocks 90 and 92 into the empty spaces 108 and 108, putting the print wiring board 94 into the empty space 109 and occluding an opening 88c at an upper end of the case body 88 by means of the case cover 96. The case body 88 and the case cover 96 provide the sensor case 95. The case body 88 and the case cover 96 are interconnected (temporarily joined) by means of engagement between lugs 97 formed so as to project at four positions in an outer peripheral surface of the case body 88 and U-shaped portions 99 formed at respective positions corresponding to the lugs 97 in the case cover 96. A connector 100 with the rubber seals 98 attached thereto is inserted into a hole 96a formed at a center portion of the case cover 96. The connector 100 is connected to a connector 102 of the print wiring board 94. Detection wirings 101 are drawn out from the connector 100. After the mirror surface angle detection device 84 is assembled to the tilting device 10, the connector 100 can be attached/detached to/from the connector 102 from the outside of the sensor case 95. Shaft portions 90a and 92a of the slide blocks 90 and 92 project outward of the sensor case 95 through circular holes 88a and 88a (FIG. 1) in a lower surface of the case body 88, so as to be movable in the axial direction. After the mirror surface angle detection device 84 is assembled, the shaft portions 90a and 92a of the slide blocks 90 and 92, which project outward of the sensor case 95, are passed through the respective O rings 104 and 104, and then inserted into respective openings 17a and 17a provided in a back surface of the housing front 12A in the FIG. 1 (openings of the communication holes 17 and 17 in the male thread members 16 and 18), and then the lower surface of the case body 88 is mounted on the back surface of the housing front 12A, and the screws 86 and 86 are passed through screw passage holes 96b and 96b (FIG. 6) of the case cover 96 and screw passage holes 88b and 88b of the case body 88 and then screwed into screw holes 12Aa and 12Aa of the housing front 12A. Consequently, the mirror surface angle detection device 84 is fixed and attached to the back surface of the housing front 12A. Here, heads of the screws 86 and 86 are locked by the case cover 96 and thus the case body 88 and the case cover 96, which are temporarily joined by means of engagement between the lugs 97 and the U-shaped portions 99 are finally joined by means of fastening of the screws 86 and 86.

Figure 7:
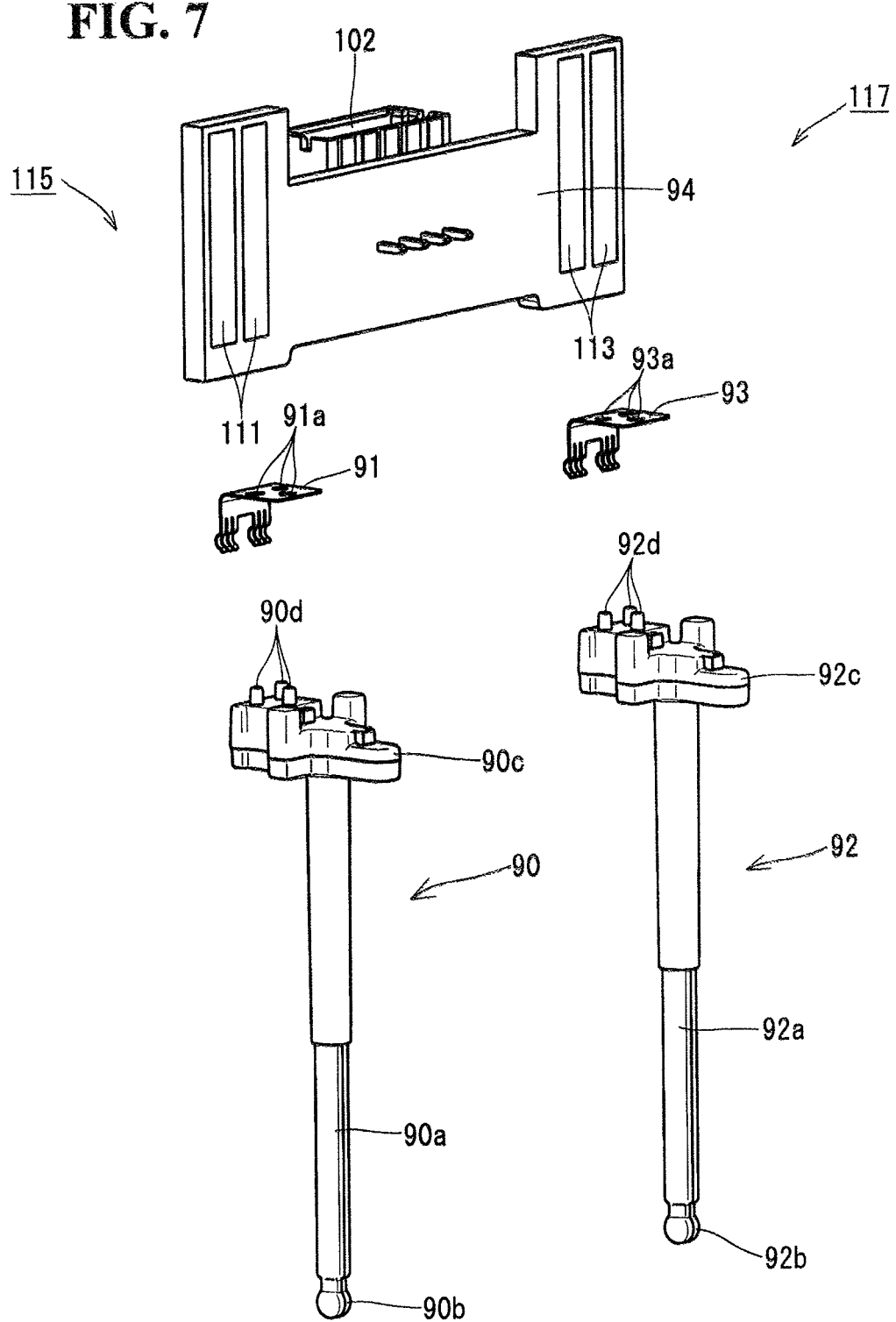
FIG. 7 is an enlarged exploded perspective view of the position detection devices 115 and 117 in FIG. 6.

FIG. 7 is an enlarged view of position detection devices 115 and 117 including the slide blocks 90 and 92, the slide contacts 91 and 93, and the print wiring board 94. Each of the slide blocks 90 and 92 is formed by, for example, a single-piece molding of a fiber-reinforced plastic. The slide blocks 90 and 92 include the shaft portions 90a and 92a, the projecting spherical portions 90b and 92b formed at extremity portions of the shaft portions 90a and 92a, and bulge portions 90c and 92c formed at the rear ends of the shaft portions 90a and 92a, respectively. The shaft portions 90a and 92a are formed so as to have a circular shape in a cross-section perpendicular to respective axes, and inserted through the communication holes 17 and 17 of the male thread members 16 and 18 so as to be movable in the axial direction, respectively. The projecting spherical portions 90b and 92b are formed so as to have a diameter that allows the projecting spherical portions 90b and 92b to pass through the communication holes 17 and 17 and are passed through the communication holes 17 and 17 and exit from extremity portions of the communication holes 17 and 17 (FIG. 1). The bulge portions 90c and 92c are formed so as to have a non-circular shape in a cross-section perpendicular to the axes of the slide blocks 90 and 92. On end surfaces of the bulge portions 90c and 92c, projections 90d and 92d are formed, respectively. Holes 91a and 93a that correspond to the projections 90d and 92d are formed in the slide contacts 91 and 93, respectively. The slide contacts 91 and 93 are fixed and attached to the bulge portions 90c and 92c by inserting the projections 90d and 92d into the holes 91a and 93a and crushing the projections 90d and 92d by means of thermal caulking, respectively. The bulge portions 90c and 92c are housed in the respective empty spaces 108 and 108 (FIGS. 1, 6 and 8) formed inside the case body 88 so as to be movable in the respective axial directions and be non-rotatable around the respective axes. On the print wiring board 94, resistors 111 and 113 are printed along respective directions of movement of the slide blocks 90 and 92. The slide contacts 91 and 93 are in contact with the resistors 111 and 113, and slide along the resistors 111 and 113 in association with movement of the slide blocks 90 and 92, respectively (FIG. 1). The combination of the slide contact 91 and the resistor 111 and the combination of the slide contact 93 and the resistor 113 form the position detection devices 115 and 117, respectively. In other words, positions in the slide contacts 91 and 93 that are in contact with the resistors 111 and 113 are detected as voltage values by detection circuits (not illustrated) through the connectors 102 and 100 and the detection wirings 101, enabling positions in the axial directions of the slide blocks 90 and 92 to be detected as values corresponding to respective mirror surface angles.

Figure 8:
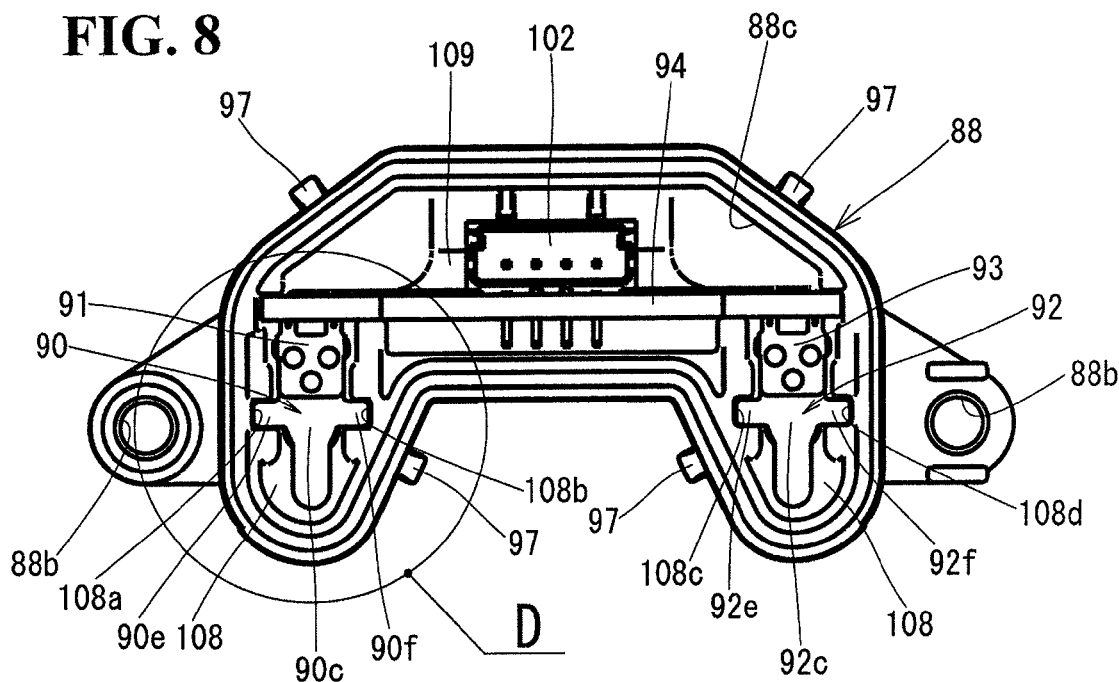
FIG. 8 is a diagram illustrating a state in which the mirror surface angle detection device 84 in FIG. 6 is assembled (which is, however, a state before a case cover 96 is attached), which is a diagram of an opening 88c at an upper end of a case body 88 as viewed from the front.
Figure 9:
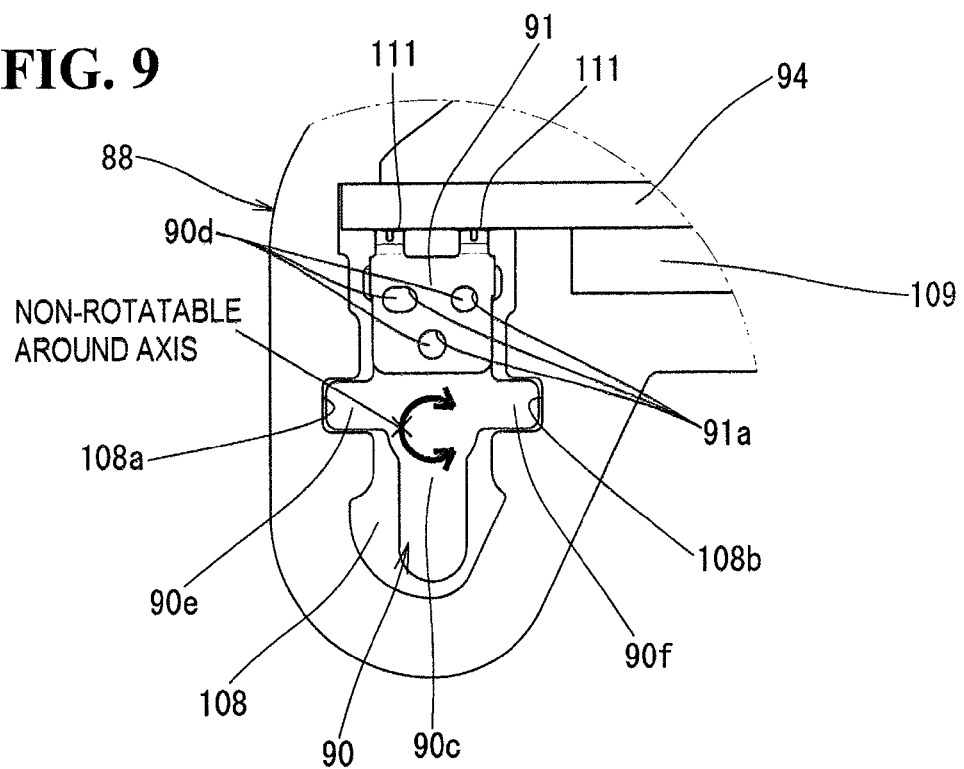
FIG. 9 is an enlarged view of the part D in FIG. 8.

A structure in which the bulge portions 90c and 92c are housed in the empty spaces 108 and 108 so as to be movable in the respective axial directions and be non-rotatable around the respective axes will be described with reference to FIG. 9, which is an enlarged view of part D in FIG. 8. At the bulge portion 90c, projections 90e and 90f that project in the left/right direction and extend in the axial direction of the slide block 90 are formed. Guide grooves 108a and 108b that correspond to the projections 90e and 90f are formed at an inner wall surface of the empty space 108. The guide grooves 108a and 108b house the projections 90e and 90f and guide the projections 90e and 90f in such a manner that the projections 90e and 90f are slidable in the axial direction of the slide block 90. As a result of fitting between the projections 90e and 90f and the guide grooves 108a and 108b, the slide block 90 is housed in the empty space 108 so as to be movable in the axial direction thereof and is non-rotatable around the axis. As a result, the slide contact 91 slides on the resistor 111 in association with movement in the axial direction of the slide block 90. Although FIG. 9 illustrates the bulge portion 90c side, a structure of fitting between projections 92e and 92f and guide grooves 108c and 108d (FIG. 8) is provided on the bulge portion 92c side as well as on the bulge portion 90c side.

Figure 10A:
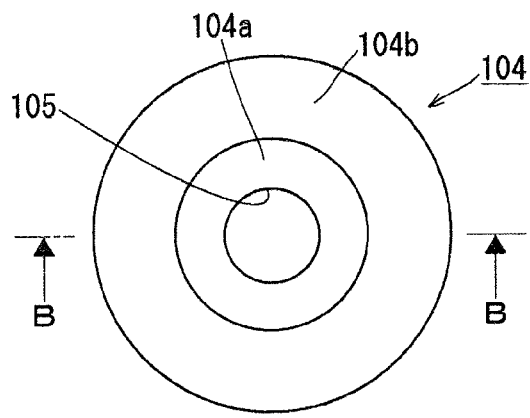
FIGS. 10A and 10B are enlarged views of the O ring 104 in FIGS. 1 and 6.
Figure 10B:
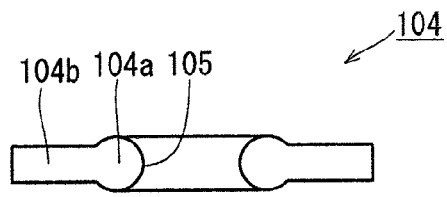
Figure 11:
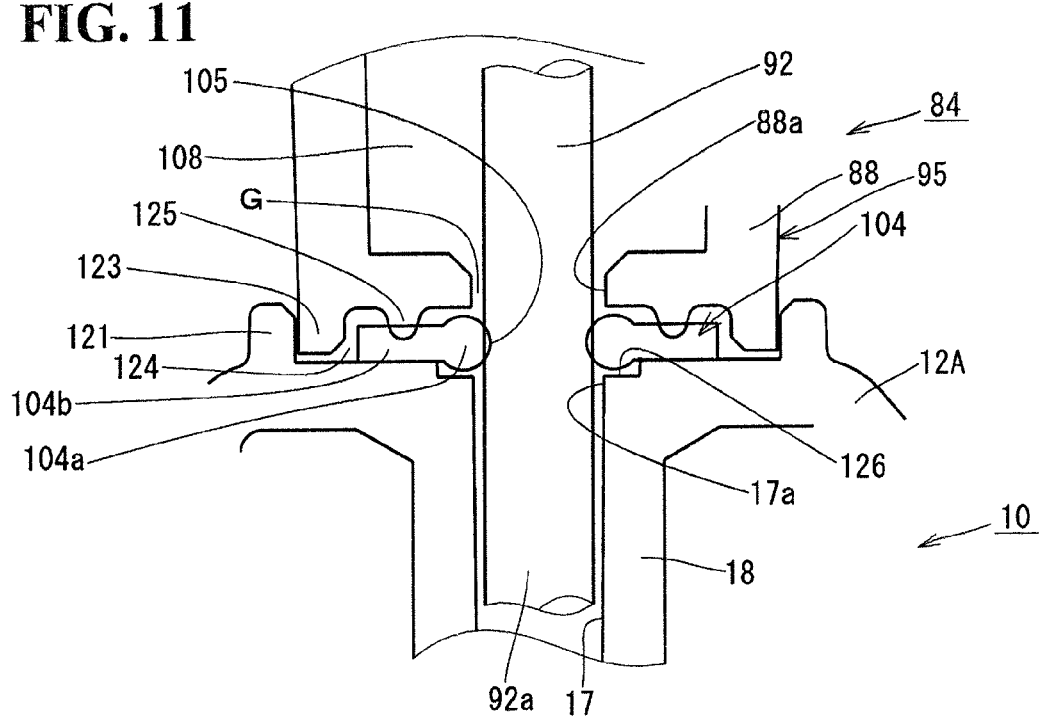
FIG. 11 is a partial enlarged cross-sectional view along arrow C-C in FIG. 1.
Figure 12:
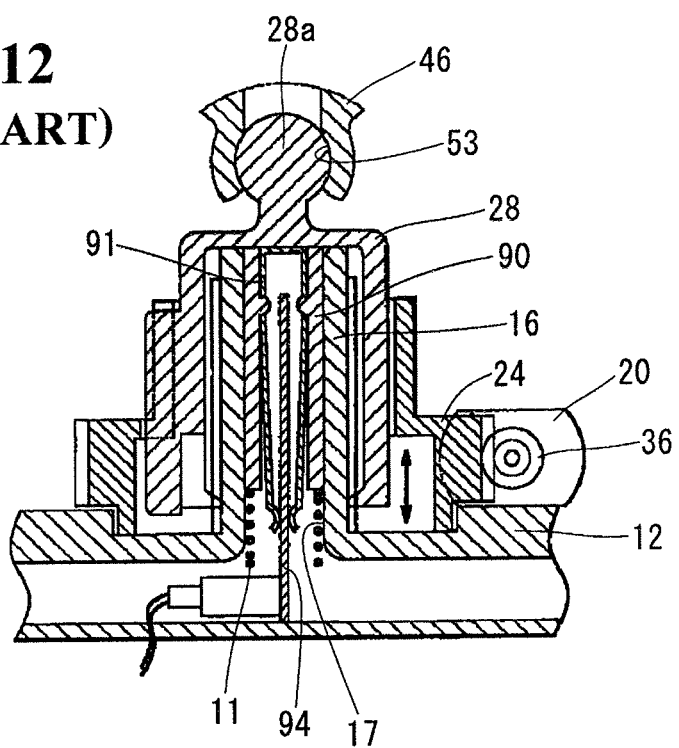
FIG. 12 is a diagram of a conventional mirror surface angle detection device, and illustrates the structure described in Japanese Patent No. 4217187.

FIGS. 10A and 10B illustrate a structure of the O ring 104. Each of the O rings 104 is a single-piece molding of an elastic body such as rubber, and is formed so as to have a flat disc shape in its entirety, and includes a circular center hole 105 formed at a center portion thereof, the circular center hole 105 allowing the corresponding shaft portion 90a or 92a of the slide block 90 or 92 to pass therethrough in such a manner that the shaft portion 90a or 92a is slidable in the axial direction. At a position facing the center hole 105, a seal portion 104a having a circular shape in a cross-section along a plane that extends through a center axis as illustrated in FIG. 10B is formed. While the seal portion 104a seals the corresponding shaft portion 90a or 92a of the slide block 90 or 92 passed through the center hole 105 in a watertight manner, the seal portion 104a allows the shaft portion 90a or 92a to move (slide) in the axial direction. At an outer peripheral edge portion of the seal portion 104a, an extension portion 104b that extends outward from the seal portion 104a is formed so as to be continuous with the seal portion 104a. As illustrated in FIG. 10B, the extension portion 104b is formed so as to have a plate-like shape having a fixed thickness smaller than that of the seal portion 104a. The extension portion 104b is held between the housing front 12A and the case body 88. The extension portion 104b serves to suppress movement of the seal portion 104a in the axial direction of the slide block 90 or 92 together with the slide block 90 or 92 in association with movement of the slide block 90 or 92 in the axial direction and serves to seal a space between the housing front 12A and the case body 88 in a watertight manner.

FIG. 1 illustrates a state in which the mirror surface angle detection device 84 is attached to the tilting device 10. At the back surface of the housing front 12A, walls 121 and 121 each having a continuous circular shape are formed so as to project coaxially with the respective communication holes 17 and 17. Also, at a back surface of the case body 88, walls 123 and 123 each having a continuous circular shape are formed so as to project coaxially with the respective circular holes 88a and 88a. The walls 121 and 121 have a diameter larger than that of the walls 123 and 123, and the walls 123 and 123 have an outer diameter (diameter of an outer peripheral surface) substantially equal to an inner diameter of the walls 121 and 121 (diameter of an inner peripheral surface). The mirror surface angle detection device 84 is positioned on the tilting device 10 by fitting the walls 123 and 123 in the inner peripheral sides of the respective walls 121 and 121, and is attached to the tilting device 10 via the screws 86 in such positioned state. The O rings 104 and 104 are housed in respective spaces 124 and 124 on the inner peripheral sides of the walls 123 and 123, and are arranged in such a manner that the O rings 104 and 104 are directly sandwiched by surfaces of the housing front 12A and the case body 88 that face each other and are in pressure contact with (crushed between) the surfaces.

FIG. 11 is an enlarged view of a part in which the O ring 104 is arranged, along arrow C-C in FIG. 1. In the back surface of the case body 88, elongated protrusions 125 having a continuous circular shape are formed coaxially with the respective circular holes 88a and the respective walls 123 between the circular holes 88a and the walls 123. When the mirror surface angle detection device 84 is attached to the tilting device 10 via the screws 86 and 86 (FIG. 6), the entire circumferences of the elongated protrusions 125 push a position partway in a radial direction of the respective extension portions 104b of the O rings 104 by means of fastening forces of the screws 86 and 86. The screws 86 and 86 are arranged on the opposite sides across the slide blocks 90 and 92, and interconnect the housing front 12A and the sensor case 95 by fastening of the screws 86 and 86 in a direction parallel to the shaft portions 90a and 92a of the slide block 90 and 92, enabling the elongated protrusions 125 to push the respective extension portions 104b without unevenness. As a result of the pushing, the surfaces of the case body 88 and the housing front 12A that face each other are sealed in a watertight manner, intrusion of water from the outside into the sensor case 95, i.e., from the outside of the facing surfaces into the sensor case 95 through a gap between the facing surfaces and a gap G between the shaft portion 92a of the mover 92 and a peripheral wall surface of the circular hole 88a of the case body 88, is blocked. Also, movement of the seal portion 104a together with the slide block 92 in the axial direction of the slide block 92 along with movement in the axial direction of the slide block 92 is suppressed. As a result of movement of the seal portion 104a being suppressed, the sealing of the shaft portion 92a by the seal portion 104a is maintained in a favorable manner, and intrusion of water from the outside into the sensor case 95 through the communication hole 17 and the gap G is also blocked. In the back surface of the housing front 12A, at an innermost peripheral position of a part in which the seal portion 104a is arranged (position facing the communication hole 17), a circular recess 126 cut concentrically with the communication hole 17 is formed. The recess 126 receives the seal portion 104a. The recess 126 provides a pressure contact releasing section that serves to release the seal portion 104a from the pressure contact by the housing front 12A and the case body 88 or weaken the pressure contact to be smaller than that in the extension portion 104b. The pressure-contact releasing section 126 suppresses crushing of the seal portion 104a, preventing an increase in frictional force between the shaft portion 92a of the slide block 92 and an inner peripheral surface of the center hole 105. Consequently, the slide block 92 can smoothly move (slide) in the axial direction. Also, the elongated protrusion 125 pushes not an innermost peripheral position but a position partway in the radial direction of the extension portion 104b of the O ring 104 (that is, the O ring 104 is fixed at a position away from the seal portion 104a), and thus, the elongated protrusion 125 does not excessively block movement of the seal portion 104a, and thus, smooth sliding of the mover 92 relative to the O ring 104 in the axial direction is not hindered.

In FIG. 1, connection between the recessed spherical portion 82 or 82 in the adjustment nut 28 or 30 and the projecting spherical portion 90b or 92b in the slide block 90 or 92 is provided by, for example, attaching the mirror surface angle detection device 84 to the tilting device 10 and then driving the motor 20 or 22 to screw the adjustment nut 28 or 30 onto the male thread member 16 or 18 at a deepest position. In other words, when the adjustment nut 28 or 30 is screwed onto the male thread member 16 or 18 to the deepest position from a state in which the recessed spherical portion 82 or 82 and the projecting spherical portion 90b or 92b are unconnected, the end surface of the bulge portion 90c or 92c of the slide block 90 or 92 abuts against an inner surface of the case cover 96 and is locked by the inner surface (position indicated by reference numeral 92c' in FIG. 1), the projecting spherical portion 90b or 92b is pressed into and thereby fitted in the recessed spherical portion 82 or 82, whereby the slide block 90 or 92 is connected to the adjustment nut 28 or 30. Alternatively, when the adjustment nut 28 or 30 is firmly pressed into the male thread member 16 or 18 by hands, the lugs 78 and the thread groove at the outer peripheral surface of the male thread member 18 are disengaged by deflection of the legs 77, and the adjustment nut 28 or 30 is pressed onto the male thread member 16 or 18 until the end surface of the bulge portion 90c or 92c of the slide block 90 or 92 abuts against the inner surface of the case cover 96, and thus, the slide block 90 or 92 can also be connected to the adjustment nut 28 or 30 by such method. Once the slide block 90 or 92 is connected to the adjustment nut 28 or 30, the slide block 90 or 92 moves following the adjustment nut 28 or 30 in the axial direction.

As illustrated in FIG. 1, upon the adjustment nut 30 being rotated by driving the motor 22 in a state in which the slide block 92 is connected to the adjustment nut 30, engagement between the lugs 78 of the adjustment nut 30 and the thread groove at the outer peripheral surface of the male thread member 18 makes the adjustment nut 30 move in the axial direction along the male thread member 18 and the plate pivot 46 connected to the projecting spherical portion 30a by means of ball joint connection vertically tilts with the tilting center O (FIG. 4) as a center, whereby a mirror surface angle in the vertical direction of the mirror 72 is adjusted. Here, the slide block 92 whose projecting spherical portion 92b is connected to the recessed spherical portion 82 in the adjustment nut 30 by means of ball joint connection moves in the axial direction following the adjustment nut 30 while rotating around the axis relative to the adjustment nut 30 via a ball joint 119 in such a manner that rotation around the axis relative to the sensor case 95 is blocked by the engagement between the projections 92e and 92f of the bulge portion 92c and the guide grooves 108c and 108d at the wall surface of the empty space 108. The slide block 92 moves in a range in which the bulge portion 92c moves to positions indicated by reference numerals 92c' (deepest position) and 92c'' (shallowest position) in FIG. 1 (position indicated by reference numeral 92c is an intermediate position). A position in the axial direction of the slide block 92 relative to the actuator housing 12 is detected as a voltage value according to a contact position in the resistor 113 that is in contact with the slide contact 93, and a mirror surface angle in the vertical direction of the mirror 72 is detected according to the voltage value.

Adjustment and detection of a mirror surface angle in the horizontal direction of the mirror 72 are performed in a manner similar to the above. In other words, upon the adjustment nut 28 being rotated by driving the motor 20, the adjustment nut 28 moves in the axial direction along the male thread member 16, and the plate pivot 46 connected to the projecting spherical portion 28a by means of ball joint connection horizontally tilts with the tilting center O (FIG. 4) as a center, whereby a mirror surface angle in the horizontal direction of the mirror 72 is adjusted. Here, the slide block 90 whose projecting spherical portion 90b is connected to the recessed spherical portion 82 in the adjustment nut 28 by means of ball joint connection moves in the axial direction following the adjustment nut 28 while rotating around the axis relative to the adjustment nut 28 via a ball joint 119 in such a manner that rotation around the axis relative to the sensor case 95 is blocked by the engagement between the projections 90e and 90f of the bulge portion 90c and the guide grooves 108a and 108b at the wall surface of the empty space 108. The slide block 90 moves in a range in which the bulge portion 90c moves to positions indicated by reference numerals 92c' and 92c" in FIG. 1. A position in the axial direction of the slide block 90 relative to the actuator housing 12 is detected as a voltage value according to a contact position in the resistor 111 that is in contact with the slide contact 91, and a mirror surface angle in the horizontal direction of the mirror 72 is detected according to the voltage value.

Although in the above embodiment, the ball joints 119 (FIG. 1) connecting the adjustment nuts 28 and 30 and the slide blocks 90 and 92 include the recessed spherical portions 82 and 82 on the adjustment nut 28 and 30 side and the projecting spherical portions 90b and 92b on the slide block 90 and 92 side, respectively, it is possible that the ball joints 119 include projecting spherical portions on the adjustment nut 28 and 30 side and recessed spherical portions on the slide block 90 and 92 side, which is opposite to the above embodiment. Also, a recessed spherical portion and a projecting spherical portion included in the ball joint 119 only need to have a rough spherical shape that enables relative rotation of the adjustment nuts 28 and 30 and the slide blocks 90 and 92 around the respective axes, and do not need to have a complete spherical shape. Also, although in the above embodiment, the adjustment nuts 28 and 30 and the slide blocks 90 and 92 are connected via the ball joints 119, such connection in the present invention is not limited to connection via ball joints, any of various connection structures that connects the slide blocks 90 and 92 to the adjustment nuts 28 and 30 so as to be rotatable around the respective axes thereof relative to the adjustment nuts 28 and 30 can be employed. Also, although in the embodiment, the plate pivot 46 and the mirror holder 70 (FIG. 2) are separately provided, a configuration in which a plate pivot is integrated with a mirror holder can be employed. In this case, the integrated mirror holder provides a tilting member. Also, although the above embodiment has been described in terms of a case where the present invention is applied to an outside mirror, the present invention can also be applied to an inside mirror.

What is claimed is:

1. A vehicle mirror apparatus comprising: a tilting device tilting a mirror to adjust a tilting angle of the mirror; and a mirror surface angle detection device detecting the tilting angle of the mirror, the tilting device including a base member, a tilting member supporting the mirror on the base member in such a manner that the mirror being tiltable around a predetermined tilting center, a male thread member provided so as to stand on the base member, a nut member having a rear end being rotatably screwed on and covering a free end of the male thread member and a front end rotatably connected to a position in the tilting member, the position being off the tilting center of the tilting member, and a drive device reversibly rotating the nut member to move the nut member along the male thread member to tilt the tilting member, the mirror surface angle detection device including a communication hole provided in the male thread member along a shaft axis of the male thread member, a mover inserted through the communication hole so as to be movable in an axial direction thereof, the mover having a front end connected to the nut member at a position in a back of the front end of the nut member so as to be rotatable relative to the nut member around an axis of the nut member, the mover moving following the nut member along the male thread member in such a manner that rotation of the mover relative to the male thread member being prevented, and a position detection device detecting a position of the mover in a direction along the male thread member relative to the base member, and wherein the mover and the nut member are interconnected via a ball joint formed between the front end of the mover and the position in the back of the front end of the nut member.

2. The vehicle mirror apparatus according to claim 1, wherein the mover includes a shaft portion inserted through the communication hole of the male thread member, a connection portion arranged outside the front end of the communication hole, the connection portion being connected to the nut member, and a bulge portion arranged outside a rear end of the communication hole, the bulge portion having a non-circular shape in a cross-section perpendicular to a direction of movement of the mover; and wherein the bulge portion is arranged in an empty space formed on the base member side, the empty space housing the bulge portion in such a manner that the bulge portion is movable in the axial direction of the mover and is non-rotatable around an axis of the mover.

3. The vehicle mirror apparatus according to claim 2, wherein the empty space is formed inside a sensor case fixed to a surface of the base member, the surface being opposite to a surface on which the male thread member stands, and the shaft portion of the mover extends out from the sensor case and is inserted through the communication hole of the male thread member.

4. The vehicle mirror apparatus according to claim 2, wherein the position detection device includes a resistor disposed on the base member side along the direction of movement of the mover, and a contact member disposed at the bulge portion of the mover, the contact member being in contact with the resistor; and wherein the contact member slides along the resistor in association with movement of the mover.

5. The vehicle mirror apparatus according to claim 3, wherein the position detection device includes a resistor disposed on the base member side along the direction of movement of the mover, and a contact member disposed at the bulge portion of the mover, the contact member being in contact with the resistor; and wherein the contact member slides along the resistor in association with movement of the mover.

* * * * *